(12) United States Patent
Van Gompel

(10) Patent No.: US 12,065,359 B2
(45) Date of Patent: Aug. 20, 2024

(54) PORTABLE FLUORINE GENERATOR FOR ON-SITE CALIBRATION

(71) Applicant: Applied Materials, Inc., Santa Clara, CA (US)

(72) Inventor: Joseph A. Van Gompel, Austin, TX (US)

(73) Assignee: Applied Materials, Inc., Santa Clara, CA (US)

(*) Notice: Subject to any disclaimer, the term of this patent is extended or adjusted under 35 U.S.C. 154(b) by 613 days.

(21) Appl. No.: 17/230,514

(22) Filed: Apr. 14, 2021

(65) Prior Publication Data

US 2022/0332575 A1 Oct. 20, 2022

(51) Int. Cl.
| | |
|---|---|
| *C01B 7/20* | (2006.01) |
| *B01J 19/08* | (2006.01) |
| *B01J 19/14* | (2006.01) |
| *C01B 21/04* | (2006.01) |

(52) U.S. Cl.
CPC ............. *C01B 7/20* (2013.01); *B01J 19/081* (2013.01); *B01J 19/14* (2013.01); *C01B 21/0405* (2013.01); *B01J 2219/00042* (2013.01); *B01J 2219/0894* (2013.01)

(58) Field of Classification Search
CPC ...... C01B 7/20; C01B 21/0405; B01J 19/081; B01J 19/14; B01J 2219/00042; B01J 2219/0894; H01L 21/02271; H01L 21/31116; H01L 21/02063; C23C 16/4405; C23C 8/08; C25B 1/245; F17C 9/00; F17C 2265/012; F17C 2227/0348; F17C 2205/0176; F17C 2221/012; F17C 2223/0123; F17C 2227/0365; F17C 2250/032; F17C 2250/043; F17C 2270/0518; F17C 2250/0626; F17C 2223/038; F17C 2223/033; F17C 2227/0157; B01D 2258/0208; B01D 2257/2047; B01D 2251/304; Y02E 60/32
See application file for complete search history.

(56) References Cited

U.S. PATENT DOCUMENTS

| | | |
|---|---|---|
| 6,110,436 A | 8/2000 | Scholz et al. |
| 6,888,040 B1 | 5/2005 | Shufflebotham et al. |
| 7,238,266 B2 | 7/2007 | Smith et al. |
| 8,128,792 B2 | 3/2012 | Hiraiwa et al. |
| 8,747,762 B2 | 6/2014 | Dickinson et al. |

(Continued)

FOREIGN PATENT DOCUMENTS

EP 1201291 A1 5/2002

OTHER PUBLICATIONS

International Search Report/ Written Opinion issued to PCT/US2022/019783 on Jun. 22, 2022.

(Continued)

*Primary Examiner* — Xiuyu Tai
(74) *Attorney, Agent, or Firm* — Patterson + Sheridan, LLP

(57) ABSTRACT

A method and apparatus for generation of fluorine gas (F2) in situ at the point of use is provided. The portable fluorine generator includes a dilution system disposed within a housing and operable to mix a feed gas comprising fluorine with an inert gas. The portable fluorine generator further includes a plasma reactor unit disposed within the housing and operable to separate fluorine (F2) from the feed gas comprising fluorine.

14 Claims, 8 Drawing Sheets

(56) References Cited

U.S. PATENT DOCUMENTS

| | | | |
|---|---|---|---|
| 9,620,407 | B2 | 4/2017 | Godet et al. |
| 10,625,312 | B2 | 4/2020 | Dickinson |
| 10,685,818 | B2 | 6/2020 | Dickinson |
| 10,748,745 | B2 | 8/2020 | Kraus et al. |
| 2008/0110744 | A1 | 5/2008 | Girard et al. |
| 2009/0044838 | A1 | 2/2009 | Willing et al. |
| 2009/0047792 | A1 | 2/2009 | Tanioka et al. |
| 2010/0089321 | A1 | 4/2010 | Siegele et al. |
| 2011/0135552 | A1 | 6/2011 | Dickinson et al. |
| 2011/0259370 | A1* | 10/2011 | Kameda ............ H01L 21/02271 134/166 R |
| 2015/0202566 | A1 | 7/2015 | Swann |
| 2016/0166868 | A1 | 6/2016 | Dickinson |
| 2017/0027049 | A1 | 1/2017 | Wang et al. |
| 2017/0173521 | A1 | 6/2017 | Dickinson et al. |
| 2017/0297066 | A1 | 10/2017 | Dickison |
| 2018/0221816 | A1 | 8/2018 | Van Gompel et al. |
| 2020/0381217 | A1 | 12/2020 | Kraus et al. |

OTHER PUBLICATIONS

International Search Report and Written Opinion dated Jun. 22, 2022 for Application No. PCT/US2022/019783.

\* cited by examiner

PORTABLE FLUORINE GENERATOR FOR ON-SITE CALIBRATION

BACKGROUND

Field

Implementations described herein generally relate to apparatus and methods for fluorine generation and more particularly to apparatus and methods for generation of fluorine at its point of use.

Description of the Related Art

Effluent produced during semiconductor manufacturing processes includes many compounds, which are abated or treated before disposal, due to regulatory requirements and environmental and safety concerns. Among these compounds are the F-gases and halogen containing compounds, which are used, for example, in etching or cleaning processes.

F-gases, such as $CF_4$, $C_2F_6$, $NF_3$ and $SF_6$, are commonly used in the semiconductor and flat panel display manufacturing industries, for example, in dielectric layer etching and chamber cleaning. Following the manufacturing or cleaning process, there is typically a residual content of the F-gases in the effluent gas stream pumped from the process tool. F-gases are difficult to remove from the effluent stream, and their release into the environment is undesirable because they are known to have relatively high greenhouse activity. Abatement systems such as remote plasma sources (RPS) or in-line plasma sources (IPS) are typically used for abatement of F-gases and other global warming gases. To ensure accuracy, these abatements systems typically involve calibration with fluorine gas. However, fluorine in its atomic and molecular state is highly toxic and reactive. Most manufacturers prefer not to have large source of fluorine on-site due to the dangers associated with its use.

Accordingly, there is a need to generate fluorine from non-toxic sources close to its point of use.

SUMMARY

The present disclosure generally relates to apparatus and methods for fluorine generation and more particularly to apparatus and methods for generation of fluorine at its point of use.

In one aspect, an apparatus for producing fluorine ($F_2$) gas is provided. The apparatus includes a housing having an inlet operable to receive an inert gas. The apparatus further includes a source operable to supply a feed gas comprising fluorine. The apparatus further includes a dilution system disposed within the housing operable to mix the feed gas comprising fluorine with the inert gas. The apparatus further includes a plasma reactor unit disposed within the housing operable to separate fluorine ($F_2$) from the feed gas comprising fluorine. The plasma reactor unit has a first inlet channel operable to receive the feed gas comprising fluorine and an outlet channel operable to deliver the fluorine gas.

Implementations may include one or more of the following. The apparatus further includes an adaptor operable to fluidly couple the outlet channel to analytical equipment. The apparatus is portable. The source is operable to supply the feed gas comprising fluorine is disposed within the housing. The apparatus further includes a pressure control mechanism operable to inhibit recombination at the outlet channel. The pressure control mechanism is a vacuum pump operable to maintain a pressure at the outlet channel. The apparatus further includes a first flow control device operable to meter a desired amount of the feed gas comprising fluorine. The first flow control device is positioned downstream from the source operable to supply the feed gas comprising fluorine and upstream from the dilution system. The apparatus further includes a second flow control device operable to meter a desired amount of the inert gas to mix with the feed gas comprising fluorine. The second flow control device is disposed within the dilution system. The dilution system is positioned upstream of the plasma reactor unit. The dilution system is positioned downstream of the plasma reactor unit. The feed gas comprising fluorine is $NF_3$ and the inert gas is $N_2$. The dilution system includes a valve where the inert gas and the feed gas comprising fluorine are mixed. The inert gas and the feed gas comprising fluorine are mixed inline in the dilution system.

In another aspect, a system for producing fluorine ($F_2$) gas is provided. The system includes a portable cart for producing fluorine ($F_2$) gas. The portable cart includes a housing and a source operable to supply a gas comprising fluorine positioned within the housing. The system further includes a dilution system disposed within the housing operable to mix the feed gas comprising fluorine with an inert gas. The system further includes a plasma reactor unit disposed within the housing operable to separate fluorine ($F_2$) from the feed gas comprising fluorine. The plasma reactor unit includes a first inlet channel operable to receive the feed gas comprising fluorine and an outlet channel operable to deliver the fluorine ($F_2$) gas, wherein the dilution system is positioned upstream of the plasma reactor unit.

Implementations may include one or more of the following. The system further includes an inert gas source fluidly coupled with the housing operable to deliver the inert gas to the dilution system. The feed gas comprising fluorine is selected from $NF_3$, $CF_4$, $SF_6$, $C_2F_6$, $C_3F_8$, or a combination thereof. The inert gas is selected from nitrogen ($N_2$) and argon. The system further includes an adaptor operable to fluidly couple the outlet channel to analytical equipment. The source is operable to supply the feed gas comprising fluorine and is disposed within the housing. The system further includes a pressure control mechanism operable to inhibit recombination at the outlet channel. The pressure control mechanism is a vacuum pump operable to maintain a pressure at the outlet channel. The system further includes a first flow control device operable to meter a desired amount of the feed gas comprising fluorine. The first flow control device is positioned downstream from the source operable to supply the feed gas comprising fluorine and upstream from the dilution system. The system further includes a second flow control device operable to meter a desired amount of the inert gas to mix with the feed gas comprising fluorine. The second flow control device is disposed within the dilution system. The dilution system is positioned upstream of the plasma reactor unit. The dilution system is positioned downstream of the plasma reactor unit. The feed gas comprising fluorine is $NF_3$ and the inert gas is $N_2$. The dilution system includes a valve where the inert gas and the feed gas comprising fluorine are mixed. The inert gas and the feed gas comprising fluorine are mixed inline in the dilution system.

In yet another aspect, a method for generating fluorine gas (F2) is provided. The method includes providing a gas comprising fluorine into a fluorine generator module. The fluorine generator module includes a dilution system and a plasma reactor unit. The method further includes dissociating the feed gas comprising fluorine into reaction products using a plasma formed by the plasma reactor unit. The reaction products comprise fluorine gas. The method further includes mixing the feed gas comprising fluorine or the fluorine gas with nitrogen gas in the dilution system. The method further includes calibrating analytical equipment with the fluorine gas.

Implementations may include one or more of the following. The feed gas comprising fluorine is selected from $NF_3$, $CF_4$, $SF_6$, $C_2F_6$, $C_3F_8$, or a combination thereof. The reaction products further comprise nitrogen gas. The dilution system is disposed within the housing and is operable to mix the feed gas comprising fluorine with the inert gas. The plasma reactor unit is disposed within a housing and is operable to separate fluorine ($F_2$) from the feed gas comprising fluorine. The plasma reactor unit has a first inlet channel operable to receive the feed gas comprising fluorine and an outlet channel operable to deliver the fluorine gas. The housing further includes an adaptor operable to fluidly couple the outlet channel to analytical equipment. The fluorine generator is portable. The source is operable to supply the feed gas comprising fluorine is disposed within the housing. The fluorine generator further includes a pressure control mechanism operable to inhibit recombination at the outlet channel. The pressure control mechanism is a vacuum pump operable to maintain a pressure at the outlet channel. The fluorine generator further includes a first flow control device operable to meter a desired amount of the feed gas comprising fluorine. The first flow control device is positioned downstream from the source operable to supply the feed gas comprising fluorine and upstream from the dilution system. The fluorine generator further includes a second flow control device operable to meter a desired amount of the inert gas to mix with the feed gas comprising fluorine. The second flow control device is disposed within the dilution system. The dilution system is positioned upstream of the plasma reactor unit. The dilution system is positioned downstream of the plasma reactor unit. The feed gas comprising fluorine is $NF_3$ and the inert gas is $N_2$. The dilution system includes a valve where the inert gas and the feed gas comprising fluorine are mixed. The inert gas and the feed gas comprising fluorine are mixed inline in the dilution system.

In another aspect, a non-transitory computer readable medium has stored thereon instructions, which, when executed by a processor, causes the process to perform operations of the above apparatus and/or method.

BRIEF DESCRIPTION OF THE DRAWINGS

So that the manner in which the above recited features of the present disclosure can be understood in detail, a more particular description of the implementations, briefly summarized above, may be had by reference to implementations, some of which are illustrated in the appended drawings. It is to be noted, however, that the appended drawings illustrate only typical implementations of this disclosure and are therefore not to be considered limiting of its scope, for the disclosure may admit to other equally effective implementations.

Figure 1A:
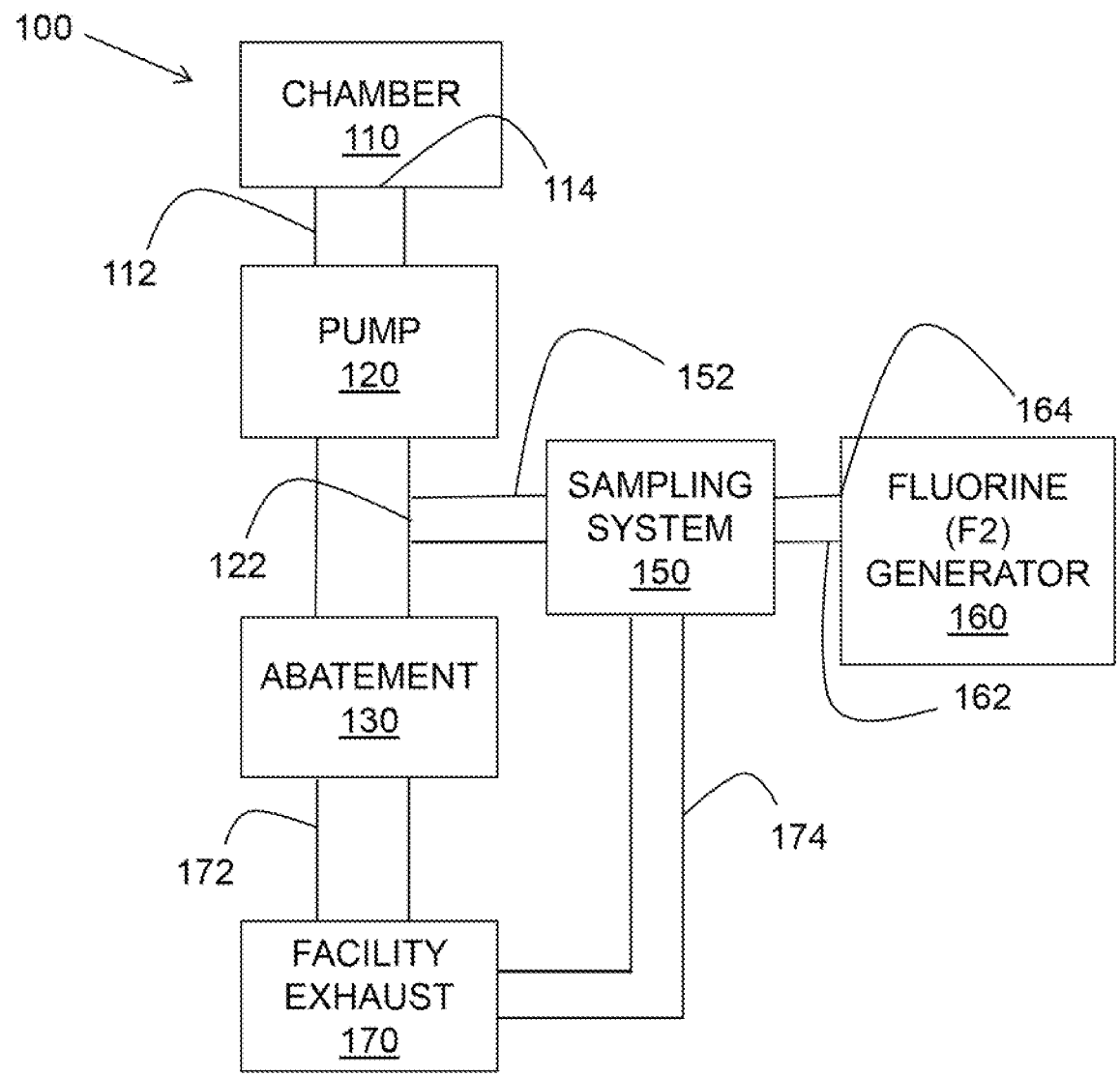
FIG. 1A illustrates a schematic diagram of a processing system including a portable fluorine generator according to one or more implementations of the present disclosure.

To facilitate understanding, identical reference numerals have been used, where possible, to designate identical elements that are common to the figures. It is contemplated that elements and features of one implementation may be beneficially incorporated in other implementations without further recitation.

DETAILED DESCRIPTION

Reference will now be made in detail to the various implementations of the present disclosure, one or more examples of which are illustrated in the figures. Within the following description of the drawings, the same reference numbers refer to the same components. Generally, only the differences with respect to individual implementations are described. Each example is provided by way of explanation of the present disclosure and is not meant as a limitation of the present disclosure. Further, features illustrated or described as part of one implementation can be used on or in conjunction with other implementations to yield yet a further implementation. It is intended that the description includes such modifications and variations.

The following disclosure describes systems and techniques for measuring gaseous fluorine emissions present in the effluent of semiconductor manufacturing processes. In addition, systems and techniques for calibrating equipment used for measuring gaseous fluorine emissions are also described. Certain details are set forth in the following description and in FIGS. 1-4 to provide a thorough understanding of various implementations of the disclosure. Other details describing well-known structures and systems often associated with abatement systems, flow control hardware, and calibration systems are not set forth in the following disclosure to avoid unnecessarily obscuring the description of the various implementations.

Many of the details, dimensions, angles and other features shown in the Figures are merely illustrative of particular implementations. Accordingly, other implementations can have other details, components, dimensions, angles and features without departing from the spirit or scope of the present disclosure. In addition, further implementations of the disclosure can be practiced without several of the details described below.

Fluorine gas ($F_2$) is typically generated during semiconductor process chamber cleans and also etch processes. Environmental regulations require fabrication plants to track and report hazardous air pollutants (HAPs), inorganic fluorides, and other classes of gaseous emissions. These gaseous emissions are often tracked using various analytical devices, for example, Fourier Transform Infrared Spectrometers (FTIR), a Quadrupole Mass Spectrometers (QMS), residual gas analyzers (RGA), and pH probes. Calibration of these analytical devices typically involves known standards which are typically purchased in advance. In the case of calibration with fluorine gas, safety is paramount due to the hazards of handling large amounts of fluorine gas. Implementations of the present disclosure provide a portable F2 generator, which generates F2 in situ at the point of use. Generating F2 in situ at its point of use avoids the hazards presented by bulk tanks with excess F2 (and associated hazards) making F2 measurements easier and safer. In addition, the portable F2 generator described herein has the capability to generate small flows needed of F2 (ppm levels) for calibration of analytical devices.

In some implementations, the portable fluorine generator described herein uses a plasma generator device to decompose $NF_3$ into $F_2+N_2$. MFCs can be used to dilute the $F_2$ mixture with more $N_2$ to the desired $F_2$ concentration as calibration standards for field $F_2$ emissions.

Gaseous fluorine (F2) emissions are common from some semiconductor processes, for example where NF3 is used to produce F2 for chamber cleans. F2 is difficult to measure in these emissions due to its corrosive nature and complications/restrictions related to F2 calibration mixtures. Systems and methods have been developed to generate in situ F2 calibration standards using a novel technique. This technique enables passivation of the sampling system as well as calibration for measurement of F2 over a wide range of concentrations down to ppm levels.

Implementations of the present disclosure can include one or more of the following advantages. The described F2 generator makes available only the F2 needed for calibration of analytical equipment and eliminates the possibility of a potentially large and catastrophic F2 leak in the event of the failure of valves or couplings from a cylinder of compressed F2. Further, generation of F2 in situ rather than using a cylinder with excess F2 will make F2 measurements easier and safer.

FIG. 1A illustrates a schematic diagram of a processing system 100 including a portable fluorine generator 160 according to one or more implementations of the present disclosure. The portable fluorine generator 160 can be a portable fluorine generator as described herein. Although shown as a component of the processing system 100, it should be understood that the processing system 100 is only an example, and the portable fluorine generator 160 can be used with other systems which can benefit from point of use generation of molecular fluorine ($F_2$) gas. As shown in FIG. 1A, the processing system 100 includes a processing chamber 110 fluidly coupled with an abatement system 130. The processing chamber 110 can be generally configured to perform at least one integrated circuit manufacturing process, such as a deposition process, a clean process, an etch process, a plasma treatment process, a preclean process, an ion implant process, or other integrated circuit manufacturing process. The process performed in the processing chamber 110 can be plasma assisted. For example, the process performed in the processing chamber 110 can be a plasma etch process for etching a silicon-based material. In one implementation, the processing chamber 110 is a plasma enhanced chemical vapor deposition (PECVD) chamber. In another implementation, the processing chamber 110 is a plasma-based etching chamber.

The processing chamber 110 can be fluidly coupled with the abatement system 130 via a foreline 112. The foreline 112 serves as a conduit that routes effluent leaving the processing chamber 110 to the abatement system 130. The effluent may contain material, which is undesirable for release into the atmosphere or may damage downstream equipment, such as vacuum pumps. For example, the effluent may contain fluorine-containing compounds from a cleaning process, a dielectric deposition process, a metal deposition process, or an etching process.

A pump 120, for example, a vacuum pump, can be positioned along the foreline 112 downstream from the processing chamber 110 and upstream from the abatement system 130. The processing chamber 110 has an exhaust port 114 coupled with the foreline 112. A throttle valve (not shown) can be positioned proximate the exhaust port 114 for controlling the pressure inside the processing chamber 110. The foreline 112 includes one or more ports, for example, a sampling port 122 through which effluent emitted by the processing chamber 110 can be sampled and monitored.

The processing system 100 further includes a sampling system 150 for monitoring effluent emitted from the processing chamber 110. The sampling system 150 includes components for monitoring various byproducts being emitted from the processing chamber 110. Examples of the various components include a Fourier Transform Infrared Spectrometer (FTIR), a Quadrupole Mass Spectrometer (QMS), and/or a residual gas analyzer (RGA). In the implementation depicted in FIG. 1A, the sampling system 150 is positioned to monitor chamber effluent prior to reaching the abatement system 130. The sampling system 150 can be fluidly coupled with the processing chamber 110 via a sampling conduit 152. The sampling conduit 152 can be fluidly coupled with the foreline 112 through the sampling port 122.

The processing system 100 further includes the portable fluorine generator 160 for generating and supplying fluorine, for example, molecular fluorine ($F_2$) gas, to the processing system 100. In the implementation shown in FIG. 1A, the portable fluorine generator 160 is positioned to provide fluorine gas to calibrate the sampling system 150. The implementation of FIG. 1A is only one example and the portable fluorine generator 160 can be positioned at other locations within the processing system 100 where there is a need for point of use fluorine generation. The portable fluorine generator 160 is further described herein with reference to FIGS. 2A and 2B. The portable fluorine generator 160 can be fluidly coupled with the sampling system 150 via a fluorine supply conduit 162. The fluorine supply conduit 162 can be fluidly coupled with the sampling system 150 through an adaptor port 164.

The processing system 100 can further include an exhaust conduit 172 that can be connected to or fluidly coupled with, for example, a facility exhaust system 170. The sampling system 150 can also be connected to or fluidly coupled with the facility exhaust system 170. The sampling system 150 can be connected to the facility exhaust system 170 through a sampling exhaust conduit 174.

Figure 1B:
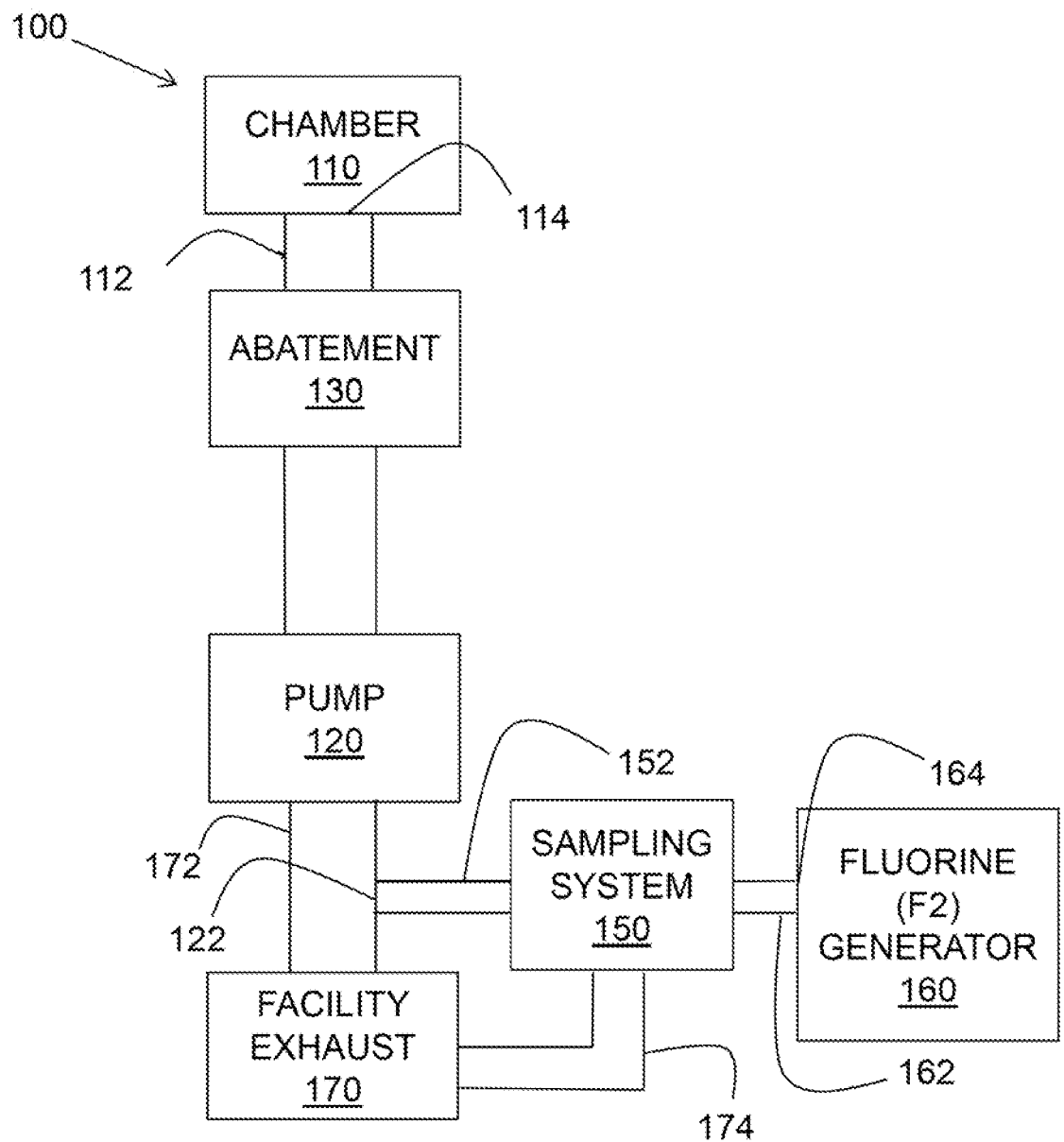
FIG. 1B illustrates a schematic diagram of another processing system including a portable fluorine generator according to one or more implementations of the present disclosure.

FIG. 1B illustrates a schematic diagram of the processing system 100 including the portable fluorine generator 160 according to one or more implementations of the present disclosure. As shown in FIG. 1B, the abatement system 130 is positioned downstream from the processing chamber 110 and upstream from the pump 120. The sampling system 150 is positioned downstream from the abatement system 130 and upstream from the facility exhaust system 170. The sampling system 150 can be fluidly coupled with the facility exhaust system 170 through the sampling conduit 152. The pump 120 is positioned downstream from the abatement system 130 and upstream from the facility exhaust system 170 and the sampling system 150.

Figure 1C:
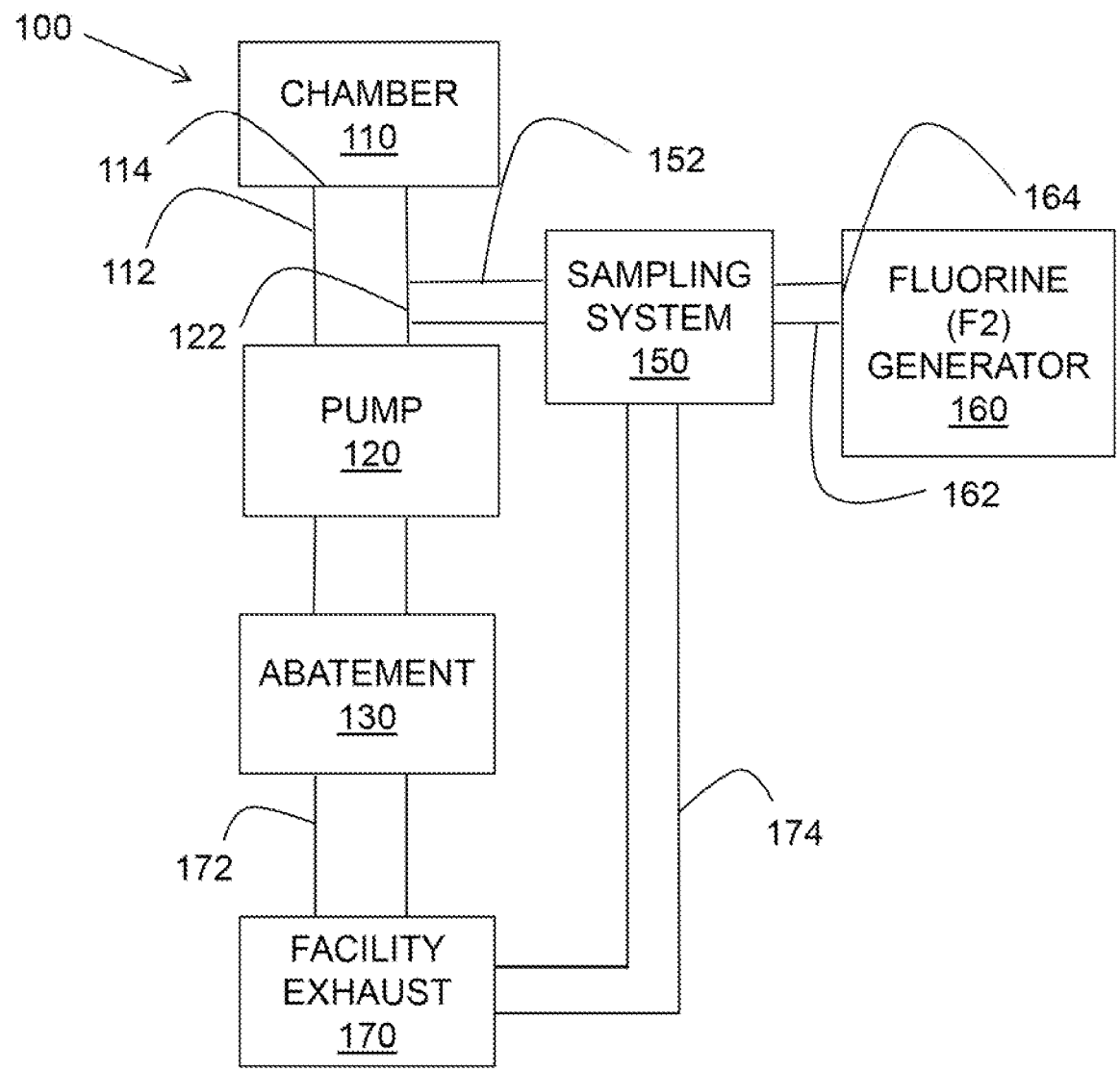
FIG. 1C illustrates a schematic diagram of another processing system including a portable fluorine generator according to one or more implementations of the present disclosure.

FIG. 1C illustrates a schematic diagram of the processing system 100 including the portable fluorine generator 160 according to one or more implementations of the present disclosure. As shown in FIG. 1C, the sampling system 150 is positioned downstream from the processing chamber 110 and upstream from the pump 120. The sampling system 150 can be fluidly coupled with the foreline 112 through the sampling conduit 152. The sampling system 150 can include a residual gas analyzer.

It should be understood that although FIGS. 1A-1C show the portable fluorine generator 160 coupled to the sampling system 150, the portable fluorine generator 160 can be fluidly coupled directly to the other components of the processing system 100. For example, the portable fluorine generator 160 can be coupled to the foreline 112, the exhaust conduit 172, the processing chamber 110, the abatement system 130, or any other components of the processing system 100.

Figure 2A:
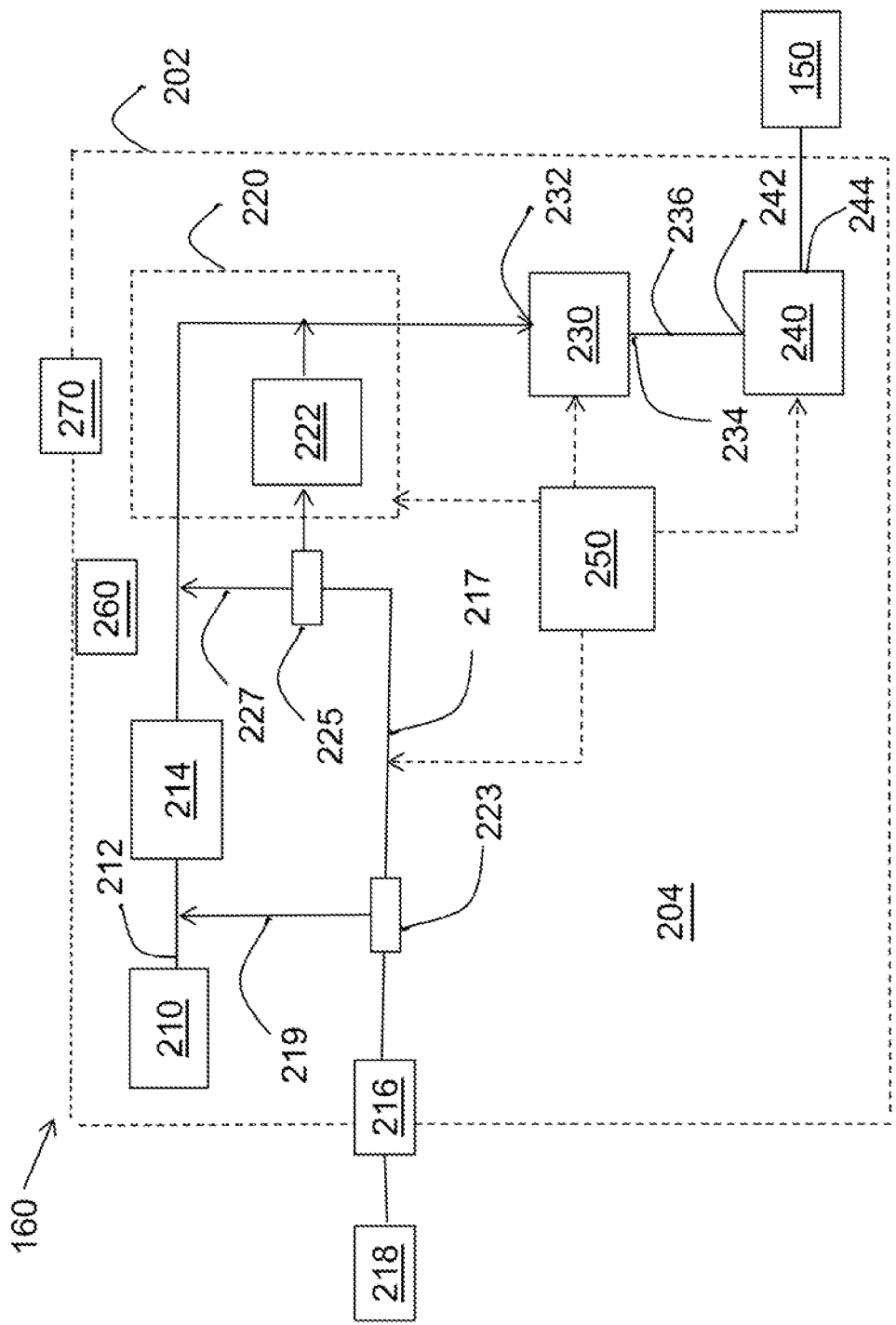
FIG. 2A illustrates a schematic diagram of one example of a portable fluorine generator according to one or more implementations of the present disclosure.

FIG. 2A illustrates a schematic diagram of the portable fluorine generator 160 according to one or more implementations of the present disclosure. As shown in FIGS. 1A and 1B, the portable fluorine generator 160 can be used with the processing system 100. The portable fluorine generator 160 can be used with other systems. The portable fluorine generator 160 may contain a housing, for example, a housing 202. The housing 202 defines an interior region 204. The portable fluorine generator 160 includes a source 210 for supplying a feed gas comprising fluorine, an inert gas injection channel 216, a dilution system 220, a plasma reactor unit 230, a pump 240, and a controller 250.

The source 210 for supplying the feed gas comprising fluorine can be positioned internal or external to the interior region 204 of the housing 202. In some implementations, where the source 210 is internal to the housing 202, the housing 202 includes a compartment for holding the source 210. The compartment can have one or more gas sensors, for example, one or more gas sensors 260, for detecting a leak in the compartment. In some implementations where the source 210 is external to the housing 202, the housing 202 includes an inlet (not shown) for fluidly coupling with the external gas source for supplying the feed gas comprising fluorine. In one example, the source 210 for supplying the feed gas comprising fluorine is a gas cylinder with a regulator. In some implementations, the gas cylinder can be sized to hold from about 0.25 to about 0.5 meters$^3$ of the feed gas comprising fluorine. Compressed gas cylinders sized to hold other suitable amounts of the feed gas comprising fluorine can be used.

In various applications, the source 210 includes one or more feed gases comprising fluorine—such as $SF_6$, $NF_3$, $CF_4$, $C_2F_6$, $C_3F_8$, and other fluorine compounds. In some implementations, the feed gas comprising fluorine includes $NF_3$. Gases that are not necessarily recirculated, and may be freshly provided to a system, can be referred to as feed stock. In various applications, the reaction products of the feed stock include a compound that includes nitrogen. In one example, where the feed stock includes $NF_3$, the reaction products can include $F_2$ and $N_2$ in gas phase.

The portable fluorine generator 160 further includes the inert gas injection channel 216. The inert gas injection channel 216 can be formed in and extend through the housing 202. The inert gas injection channel 216 is configured to deliver an inert gas to the portable fluorine generator 160. The inert gas injection channel 216 can be fluidly coupled with an inert gas source 218. Although the inert gas source 218 is shown as external to the housing 202, it should be understood that in some implementations, the inert gas source 218 is positioned within the housing 202. In one example, the inert gas source 218 is a gas cylinder with a regulator. The inert gas source 218 can provide a gas such as nitrogen ($N_2$), argon (Ar), helium, neon, krypton, xenon, or a combination thereof. In one example, the inert gas source 218 supplies nitrogen ($N_2$) to the portable fluorine generator 160. The inert gas can be delivered to the portable fluorine generator 160 to dilute the feed gas comprising fluorine and/or the fluorine gas produced by the plasma reactor unit 230. The inert gas can also be delivered to the portable fluorine generator 160 as a purge gas to purge the portable fluorine generator 160.

The portable fluorine generator 160 further includes the dilution system 220. The dilution system 220 is configured for mixing the feed gas comprising fluorine with the inert gas. In one example, the dilution system 220 is configured for mixing $NF_3$ with $N_2$. As shown in FIG. 2A, the dilution system 220 can be disposed within the housing 202. The dilution system 220 includes a first flow control device 222 for metering a desired amount of nitrogen to mix with the feed gas comprising fluorine. The first flow control device 222 can be directly or indirectly connected to inert gas injection channel 216. The first flow control device 222 can be any suitable active or passive flow control device, such as a fixed orifice, mass flow controller, needle valve or the like. The first flow control device 222 can be a mass flow controller. The first flow control device 222 can be a pressure control device, can simply incorporate a pressure control device or may only regulate flow independent of pressure.

The portable fluorine generator 160 further includes the plasma reactor unit 230. The plasma reactor unit 230 is configured to separate molecular fluorine ($F_2$) gas from the feed gas comprising fluorine. In various implementations, the plasma reactor unit 230 includes a microwave plasma generator, an RF inductively coupled plasma generator, an RF toroidal inductively coupled plasma generator, or an RF capacitively coupled plasma generator. In one example, the plasma reactor unit 230 includes a modular microwave source. The plasma reactor unit 230 includes an inlet channel 232 and an outlet channel 234. The feed gas comprising fluorine or a gas mixture comprising the feed gas comprising fluorine and the inert gas is received at the inlet channel 232 of the plasma reactor unit 230. The plasma reactor unit 230 forms a plasma that dissociates the feed gas comprising fluorine into reaction products. The reaction products exit the plasma reactor unit 230 via the outlet channel 234. In one example, where a gas mixture of $NF_3$ and $N_2$ enter the plasma reactor unit 230, reaction products including $F_2$ and $N_2$ exit the plasma reactor unit 230. The plasma reactor unit 230, in various implementations, operates at or below atmospheric pressure.

In some implementations, the plasma reactor unit 230 is replaced by a thermal decomposition reactor unit. The thermal decomposition reactor unit is configured to separate molecular fluorine ($F_2$) gas from the feed gas comprising fluorine. The thermal decomposition reactor unit can be a thermal pyrolyzer.

In some implementations, a reactant gas is introduced to the plasma reactor unit 230 in addition to the feed gas comprising fluorine. In these implementations, the plasma reactor unit 230 forms a plasma that dissociates or excites the reactants gas, as well as the feed gas comprising fluorine. The reactant gas may be introduced to the plasma reactor unit 230 via the inlet channel 232. The reactive gas in some applications is $O_2$. For example, the feed gas comprising fluorine can be $CF_4$ and the reactive gas is $O_2$ to form the fluorine gas.

Figure 2B:
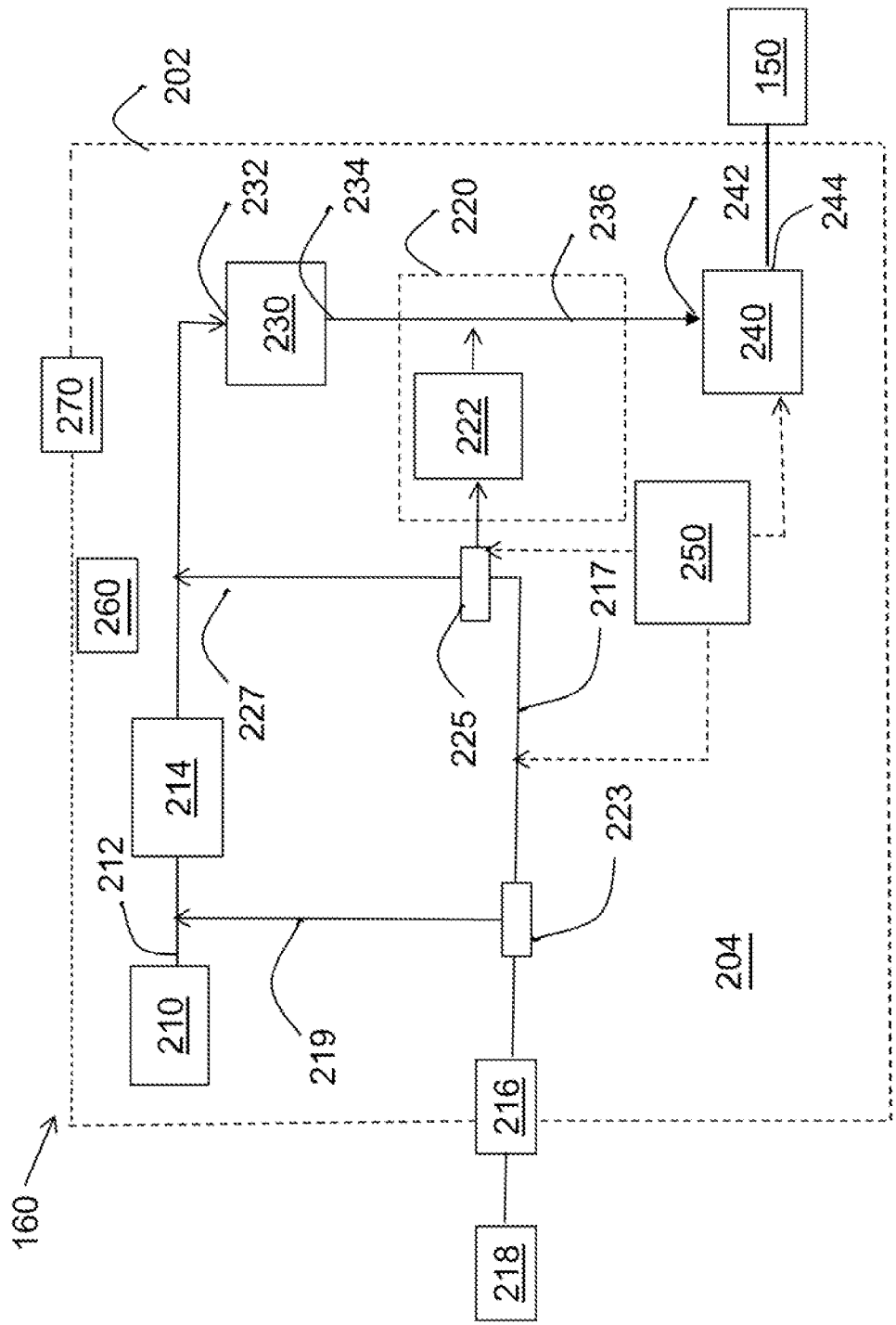
FIG. 2B illustrates a schematic diagram of another example of the portable fluorine generator according to one or more implementations of the present disclosure.

In the implementation of FIG. 2A, the dilution system 220 is positioned upstream from the plasma reactor unit 230 such that the source gas comprising fluorine is diluted with the inert gas in the dilution system 220 prior to entering the plasma reactor unit 230. As shown in FIG. 2B, other configurations of the dilution system 220 and the plasma reactor unit 230 are also contemplated.

The portable fluorine generator 160 can further include the pump 240. The pump 240 can be a vacuum pump. The pump 240 is positioned downstream from the plasma reactor unit 230. The pump 240 includes an inlet channel 242 for receiving the reaction products from the plasma reactor unit 230. In the implementation shown in FIG. 2A, the inlet channel 242 of the pump 240 is fluidly coupled with the outlet channel 234 of the plasma reactor unit 230 via a conduit 236. The pump 240 further includes an outlet channel 244. The outlet channel 244 can include an adapter for connecting the outlet channel 244 to the system to be calibrated, for example, the sampling system 150. The pump 240 pulls fluorine gas from the plasma reactor unit 230 and directs the fluorine gas to the sampling system 150. The pump 240 can be an electrical pump or any other appropriate pump. The pump 240 can be positioned in the housing 202 as shown in FIG. 2A or can be positioned external to the housing 202. In one example, the pump 240 can be sized to have a capacity from about 3 meters$^3$/hour to about 5 meters$^3$/hour. Pumps of other suitable capacities can be used.

The portable fluorine generator 160 can further include a controller 250 employed to control operation of various components of the portable fluorine generator 160. For example, the controller 250 can be electronically coupled with one or more of flow control devices and valves to monitor and control the flow of inert gases and the source gas comprising fluorine. The controller 250 may be connected (e.g., networked) to a personal computer or laptop, or to other machines in a Local Area Network (LAN), an intranet, an extranet, or the Internet. Further, while only a single controller 250 is illustrated, the term "controller" shall also be taken to include any collection of controllers that individually or jointly execute a set (or multiple sets) of instructions to perform any one or more of the methodologies described herein. The controller 250 can include a central processing unit (CPU) (not shown), memory (not shown), and support circuits for inputs and outputs (I/O) (not shown). The CPU may be one of any form of computer processors that are used in industrial settings for controlling various system functions, substrate movement, chamber processes, and control support hardware (e.g., sensors, motors, heaters, etc.), and monitor the processes performed in the system. The memory is connected to the CPU, and may be one or more of a readily available non-volatile memory, such as random access memory (RAM), flash memory, read only memory (ROM), or any other form of digital storage, local or remote. Software instructions and data can be coded and stored within the memory for instructing the CPU. The support circuits are also connected to the CPU for supporting the processor in a conventional manner. The support circuits may include cache, power supplies, clock circuits, input/output circuitry, subsystems, and the like. A program or a non-transitory computer readable medium has stored thereon instructions readable by the controller 250 to determine which tasks are performable by the components in the portable fluorine generator 160. The program may be software readable by the controller 250 that includes code to perform tasks relating to the delivery of inert gas and the source gas comprising fluorine to the plasma reactor unit 230.

The source 210 is fluidly coupled with the inlet channel 232 of the plasma reactor unit 230 via a source gas supply conduit 212 or first conduit. A second flow control device 214 is positioned along the source gas supply conduit 212 for metering a desired amount of the feed gas comprising fluorine to mix with the inert gas. The second flow control device 214 can be a mass flow control (MFC) device. One or more valves may be positioned along the source gas supply conduit 212 between the source 210 and the inlet channel 232 of the plasma reactor unit 230. For example, in some implementations, a valve scheme may include a two-way control valve (not shown), which functions as an on/off switch for controlling the flow the one or more gases comprising fluorine from the source 210 into the plasma reactor unit 230, and the second flow control device 214, which controls the flow rates of the feed gas comprising fluorine into the plasma reactor unit 230. The second flow control device 214 may be disposed between the source 210 and the two-way control valve. The two-way control valve may be any suitable control valve, such as a solenoid valve, pneumatic valve, needle valve or the like. The second flow control device 214 may be any suitable active or passive flow control device, such as a fixed orifice, mass flow controller, needle valve or the like.

The inert gas injection channel 216 is fluidly coupled with the first flow control device 222 via an inert gas supply conduit 217 or second conduit. The inert gas supply conduit 217 is fluidly coupled with the source gas supply conduit 212 via a first purge conduit 219 or a third conduit. The first purge conduit 219 is operable to deliver the inert gas into the inert gas supply conduit 217 downstream from the source 210 and upstream of the second flow control device 214. A first valve 223 positioned at the intersection of the inert gas supply conduit 217 and the inert gas purge conduit controls the flow of inert gas from the inert gas supply conduit 217 to the source gas supply conduit 212. Inert gas delivered through the first purge conduit 219 can be used to as a purge gas to purge the portable fluorine generator 160. A second valve 225 positioned along the inert gas supply conduit controls the flow of the inert gas into either the first flow control device 222 or a second purge conduit 227 or fourth conduit. The inert gas supply conduit 217 is fluidly coupled with the source gas supply conduit 212 via the second purge conduit 227. The second purge conduit 227 delivers inert gas into the source gas supply conduit 212 downstream from the second flow control device 214 and upstream of the plasma reactor unit 230.

The portable fluorine generator 160 can further include the one or more gas sensors 260. The one or more gas sensors 260 can be used to detect a gas leak within the interior region 204 of the housing 202. That is, if during operation of the portable fluorine generator 160, the one or more gas sensor(s) 260 (the number of leak sensors usually depends on the type of gas to be delivered) detects a gas leak in the interior region 204 of the housing 202, for example, from the source 210 or the plasma reactor unit 230 or any other components within the housing 202, a signal can be communicated to the controller 250 which in turn may communicate a signal to, for example, turn off the source 210 and/or turn off the inert gas source 218 to increase a distribution of the inert gas into the housing 202. The distribution of the inert gas into the interior region 204 of the housing 202 can be either turned on, if off, or increased to increase a concentration of the inert gas in the interior region of the housing 202 to, for example, reduce the flammability of any gases leaking within the interior region 204 of the housing 202.

The portable fluorine generator 160 can further include one or more vent channels 270 for venting gases from the interior region 204 of the housing 202. The one or more vent channels 270 enable removal of unwanted gases, for example, toxic gases or flammable gases, from the interior region 204 of the housing 202. For example, of the one or more gas sensors 260 can detect a gas leak within the interior region 204 of the housing 202, a signal can be communicated to the controller 250 which in turn may communicate a signal to, for example, open the one or more vent channels 270 to purge the released gases from the interior region 204 of the housing 202.

FIG. 2B illustrates a schematic diagram of another example of the portable fluorine generator 160 according to one or more implementations of the present disclosure. In FIG. 2B, the plasma reactor unit 230 is positioned upstream from the dilution system 220 such that the reaction products exiting the outlet channel 234 of the plasma reactor unit 230 are diluted with the inert gas in the dilution system 220 prior to entering the pump 240. The inert gas injection channel 216 is fluidly coupled with the conduit 236 via the inert gas supply conduit 217 and the first flow control device 222. The reaction products from the plasma reactor unit 230 can be mixed with the inert gas in-line in the conduit 236.

Figure 2C:
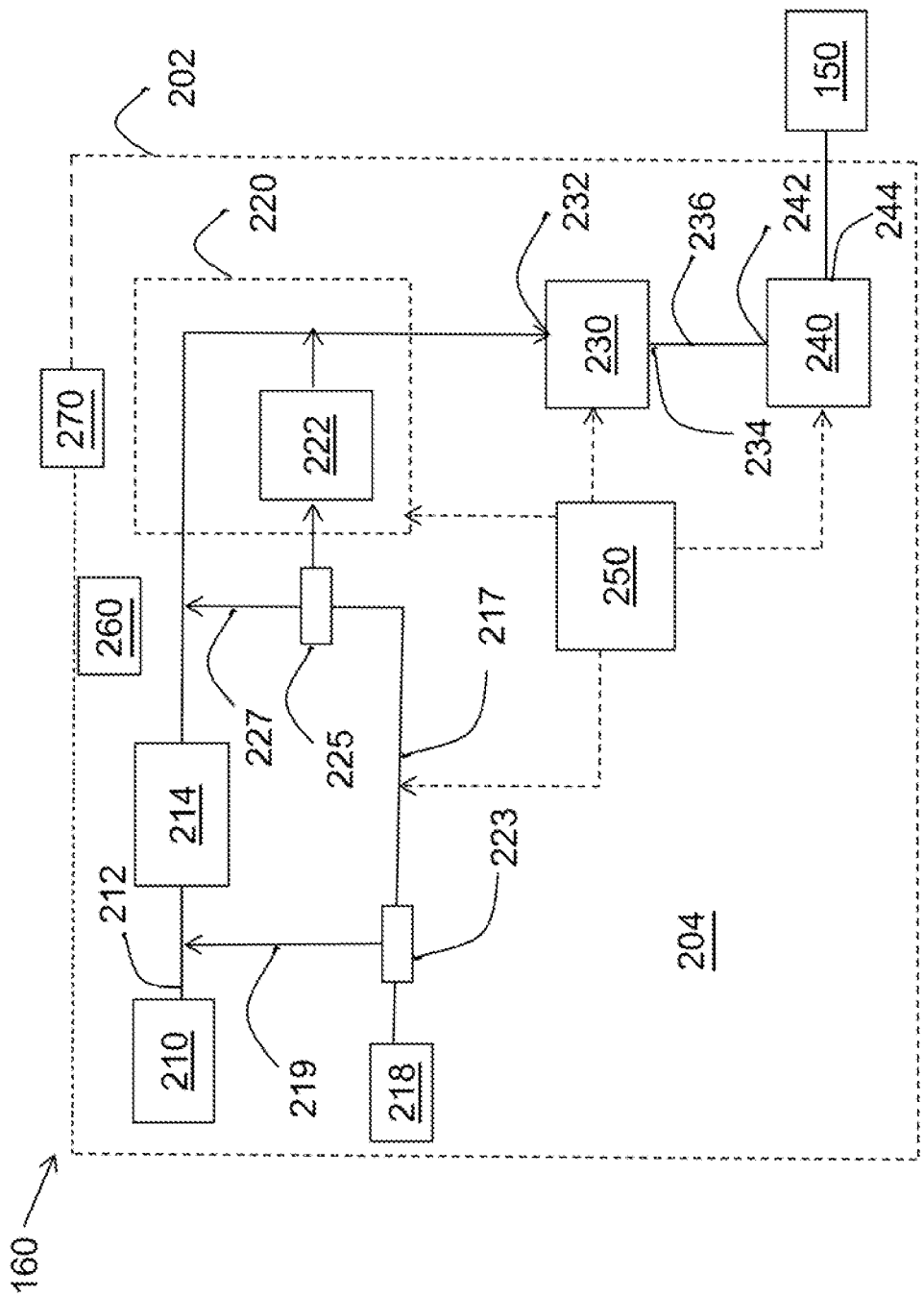
FIG. 2C illustrates a schematic diagram of another example of the portable fluorine generator according to one or more implementations of the present disclosure.

FIG. 2C illustrates a schematic diagram of another example of the portable fluorine generator 160 according to one or more implementations of the present disclosure. In the implementation depicted in FIG. 2C, the inert gas source 218 is positioned within the housing 202 and fluidly coupled with the inert gas supply conduit 217.

Figure 3:
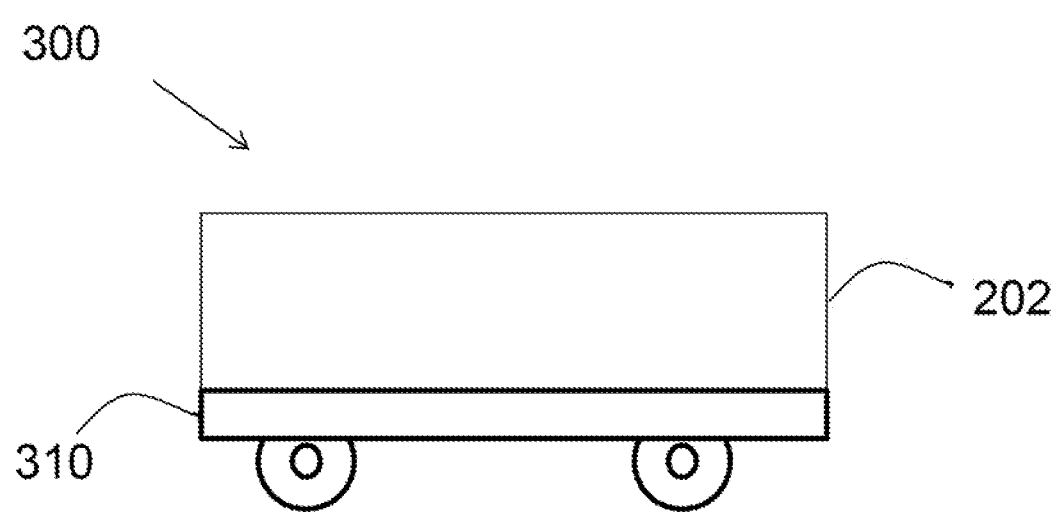
FIG. 3 illustrates a schematic view of a portable fluorine generator according to one or more implementations of the present disclosure.

FIG. 3 illustrates a schematic view of a portable fluorine generator 300 according to one or more implementations of the present disclosure. In the exemplary implementation of FIG. 3, the housing 202 is a cabinet. The cabinet can be supported on a stationary or mobile cart 310 and/or may be a mobile unit or "fluorine cart." The cabinet can be, for example, a ventilated chemical cabinet and may be capable of containing any gases which may build up inside the enclosed cabinet. The cabinet may also be capable of ventilating (e.g., releasing and/or pumping) gases to an external location, such as the facility exhaust system 170. In some implementations, the cabinet is a double cabinet type structure (e.g., a double walled and/or double containment cabinet). For example, the cabinet can include an outer and inner cabinet (not separately shown) which may each be independently sealable. The cabinet can be constructed of any suitable materials (e.g., stainless steel (SST), PVDF, PVA, polytetrafluoroethylene such as Teflon® available from Dupont, etc.).

Figure 4:
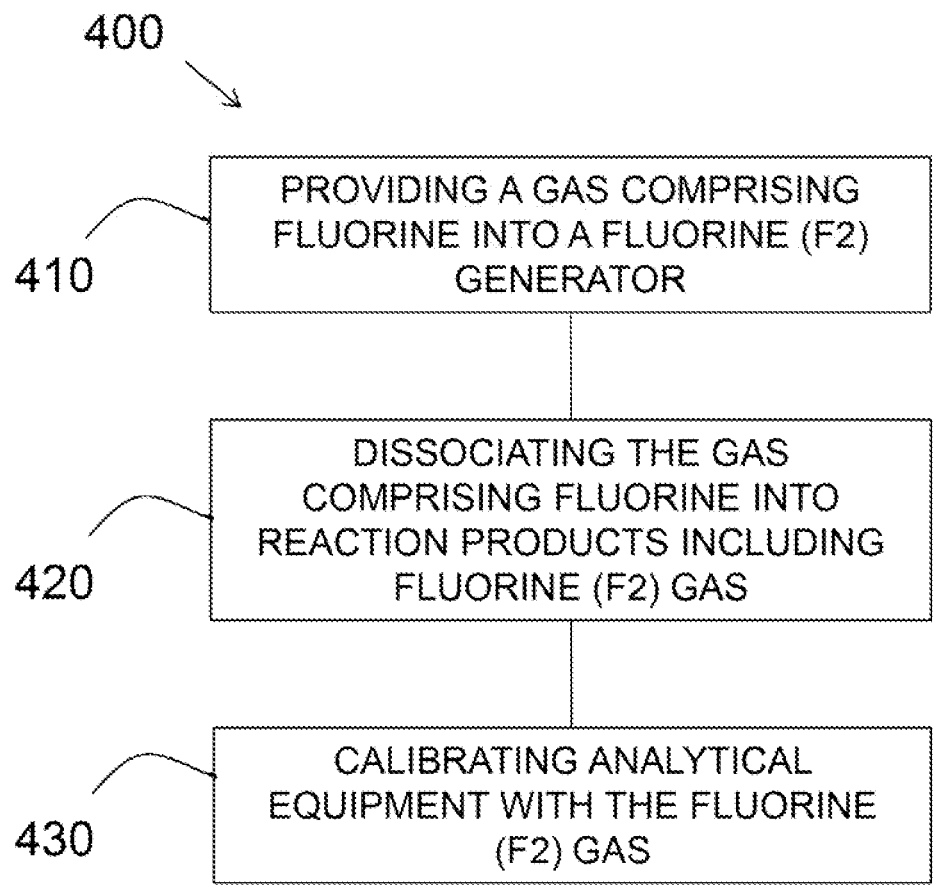
FIG. 4 illustrates a flow diagram of a method for generating fluorine gas according to one or more implementations of the present disclosure.

FIG. 4 illustrates a flow diagram of a method 400 for generating fluorine ($F_2$) gas according to one or more implementations of the present disclosure. The generated fluorine gas can be generated at its point of use and used for, among other things, calibration of analytical equipment used to monitor fluorine emissions. The method 400 can be performed using any of the implementations of the processing system 100 and/or the portable fluorine generator 160 described herein. At operation 410 a gas comprising fluorine is provided to a fluorine ($F_2$) generator, for example, the portable fluorine generator 160. In some implementations, the source for the feed gas comprising fluorine can be positioned within the fluorine generator. For example, the source can be a portable gas cylinder. In other implementations, the source for the feed gas comprising fluorine is external to the fluorine generator. For example, the source can be a facility supply or a gas cylinder. The feed gas comprising fluorine can be selected from $SF_6$, $NF_3$, $CF_4$, $C_2F_6$, $C_3F_8$, or a combination thereof. In one example, the feed gas comprising fluorine is $NF_3$.

The method 400 can further include diluting the feed gas comprising fluorine with an inert gas prior to entering a plasma reactor unit. The inert gas can provide a gas such as nitrogen ($N_2$), argon (Ar), helium, neon, krypton, xenon, or a combination thereof. In one example, the inert gas is nitrogen. The inert gas can be supplied by a dilution system positioned within the portable fluorine generator. The inert gas can be mixed with the feed gas comprising fluorine within a dilution system within the portable fluorine generator, for example, the dilution system 220 positioned in the portable fluorine generator 160. The amount of inert gas can be metered to deliver a desired amount of the inert gas to mix with the feed gas comprising fluorine.

At operation 420, the feed gas comprising fluorine is dissociated into reaction products including the fluorine gas. The feed gas comprising fluorine can be exposed to a plasma in a plasma reactor unit, for example, the plasma reactor unit 230, to dissociate the feed gas comprising fluorine. The plasma reactor unit separates molecular fluorine ($F_2$) gas from the feed gas comprising fluorine. A plasma dissociates the feed gas comprising fluorine into reaction products. In one example, where a gas mixture of $NF_3$ and $N_2$ enter the plasma reactor unit, reaction products including $F_2$ and $N_2$ exit the plasma reactor unit. The feed gas comprising fluorine can be dissociated at or below atmospheric pressure.

The method 400 can further include diluting the fluorine gas with an inert gas after the fluorine gas exits the plasma reactor unit. The inert gas can be mixed with the fluorine gas using inert gas supplied by the dilution system within the portable fluorine generator, for example, the dilution system 220 positioned in the portable fluorine generator 160. The amount of inert gas can be metered to deliver a desired amount of the inert gas to mix with the fluorine gas.

At operation 430 analytical equipment is calibrated with the fluorine gas produced by the fluorine generator. The analytical equipment can be part of a sampling system, for example, the sampling system 150. The analytical equipment can include but is not limited to Fourier Transform Infrared Spectrometers (FTIR), a Quadrupole Mass Spectrometers (QMS), and/or residual gas analyzers (RGA). The fluorine gas can be delivered from the portable fluorine generator to the analytical equipment using a vacuum pump, for example, the pump 240. In one example, the pump can be sized to deliver a fluorine gas mixture at a rate of up to about 1 liter per minute to the sampling system 150. Other suitable flow rates can be used.

Implementations and all of the functional operations described in this specification can be implemented in digital electronic circuitry, or in computer software, firmware, or hardware, including the structural means disclosed in this specification and structural equivalents thereof, or in combinations of them. Implementations described herein can be implemented as one or more non-transitory computer program products, i.e., one or more computer programs tangibly embodied in a machine readable storage device, for execution by, or to control the operation of, data processing apparatus, e.g., a programmable processor, a computer, or multiple processors or computers.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. Processors suitable for the execution of a computer program include, by way of example, both general and special purpose microprocessors, and any one or more processors of any kind of digital computer.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

When introducing elements of the present disclosure or exemplary aspects or implementation(s) thereof, the articles "a," "an," "the" and "said" are intended to mean that there are one or more of the elements.

The terms "comprising," "including" and "having" are intended to be inclusive and mean that there may be additional elements other than the listed elements.

While the foregoing is directed to implementations of the present disclosure, other and further implementations of the disclosure may be devised without departing from the basic scope thereof, and the scope thereof is determined by the claims that follow.

The invention claimed is:

1. An apparatus for producing fluorine ($F_2$) gas, comprising:
    a housing having an inlet operable to receive an inert gas;
    a source disposed within the housing, the source operable to supply a feed gas comprising fluorine;
    a dilution system disposed within the housing operable to mix the feed gas comprising fluorine with the inert gas, the dilution system disposed downstream of the inlet and the source; and
    a plasma reactor unit disposed within the housing and disposed downstream of the dilution system, the plasma reactor operable to generate fluorine ($F_2$) gas from the feed gas comprising fluorine, the plasma reactor unit having:
        a first inlet channel operable to receive the feed gas comprising fluorine; and
        an outlet channel operable to deliver the fluorine ($F_2$) gas.

2. The apparatus of claim 1, further comprising an adaptor operable to fluidly couple the outlet channel to analytical equipment.

3. The apparatus of claim 1, wherein the apparatus is portable.

4. The apparatus of claim 1, wherein the apparatus further comprises a pressure control mechanism operable to inhibit recombination at the outlet channel.

5. The apparatus of claim 4, wherein the pressure control mechanism is a vacuum pump operable to maintain a pressure at the outlet channel.

6. The apparatus of claim 1, further comprising a first flow control device operable to meter a desired amount of the feed gas comprising fluorine, the first flow control device positioned downstream from the source operable to supply the feed gas comprising fluorine and upstream from the dilution system.

7. The apparatus of claim 6, further comprising a second flow control device operable to meter a desired amount of the inert gas to mix with the feed gas comprising fluorine, the second flow control device disposed within the dilution system.

8. The apparatus of claim 1, wherein the feed gas comprising fluorine is $NF_3$ and the inert gas is $N_2$.

9. The apparatus of claim 1, wherein the dilution system comprises a valve where the inert gas and the feed gas comprising fluorine are mixed.

10. The apparatus of claim 1, wherein the inert gas and the feed gas comprising fluorine are mixed inline in the dilution system.

11. A system for producing fluorine ($F_2$) gas, comprising:
    a portable cart, comprising:
        a housing having an inlet operable to receive an inert gas;
        a source disposed within the housing, the source operable to supply a feed gas comprising fluorine;
        a dilution system disposed within the housing operable to mix the feed gas comprising fluorine with the inert gas, the dilution system disposed downstream of the inlet and the source; and
        a plasma reactor unit disposed within the housing and disposed downstream of the dilution system, the plasma reactor operable to generate fluorine ($F_2$) gas from the feed gas comprising fluorine, the plasma reactor unit having:
            a first inlet channel operable to receive the feed gas comprising fluorine; and
            an outlet channel operable to deliver the fluorine ($F_2$) gas.

12. The system of claim 11, further comprising an inert gas source fluidly coupled with the housing operable to deliver the inert gas to the dilution system.

13. The system of claim 12, wherein the feed gas comprising fluorine is selected from $NF_3$, $CF_4$, $SF_6$, $C_2F_6$, $C_3F_8$, or a combination thereof.

14. The system of claim 13, wherein the inert gas is selected from nitrogen ($N_2$) and argon.

* * * * *